(12) United States Patent
Singh et al.

(10) Patent No.: US 11,807,173 B2
(45) Date of Patent: Nov. 7, 2023

(54) VEHICLE FRONT END ASSEMBLY

(71) Applicant: NISSAN NORTH AMERICA, INC., Franklin, TN (US)

(72) Inventors: Jasvir Singh, Novi, MI (US); Todd Fathbruckner, Roseville, MI (US)

(73) Assignee: Nissan North America, Inc., Franklin, TN (US)

( * ) Notice: Subject to any disclaimer, the term of this patent is extended or adjusted under 35 U.S.C. 154(b) by 59 days.

(21) Appl. No.: 17/528,164

(22) Filed: Nov. 16, 2021

(65) Prior Publication Data

US 2023/0150580 A1 May 18, 2023

(51) Int. Cl.
*B60R 13/04* (2006.01)

(52) U.S. Cl.
CPC .................................. *B60R 13/04* (2013.01)

(58) Field of Classification Search
CPC .......... F21S 41/50; F21S 41/55; B62D 25/05; B62D 25/08; B60R 13/005; B60R 13/04
USPC ............................ 296/193.09, 1.08; 362/546
See application file for complete search history.

(56) References Cited

U.S. PATENT DOCUMENTS

| | | | |
|---|---|---|---|
| D565,758 S * | 4/2008 | Conway | F21S 41/50 |
| | | | D26/28 |
| 8,567,853 B2 * | 10/2013 | Huber | B60R 19/24 |
| | | | 293/120 |
| 9,541,250 B2 * | 1/2017 | Japs | F21S 41/55 |
| 9,638,384 B2 * | 5/2017 | Japs | F21S 41/29 |
| 9,821,861 B2 * | 11/2017 | Murray | B62D 25/105 |
| 10,661,700 B2 * | 5/2020 | Orisich | F21S 41/50 |
| 10,704,756 B2 * | 7/2020 | Glickman | F21S 41/29 |
| 2006/0152039 A1 * | 7/2006 | Tomasson | B60R 13/00 |
| | | | 296/180.2 |
| 2009/0160218 A1 * | 6/2009 | Onuma | B05B 13/0292 |
| | | | 296/191 |
| 2015/0204500 A1 | 7/2015 | Japs et al. | |
| 2016/0144900 A1 * | 5/2016 | Fortin | E02F 3/963 |
| | | | 296/193.1 |
| 2018/0015887 A1 | 1/2018 | Salter et al. | |

* cited by examiner

*Primary Examiner* — Jason S Morrow
(74) *Attorney, Agent, or Firm* — Global IP Counselors, LLP (57) ABSTRACT

A vehicle front end assembly includes a fender, a headlamp assembly and a trim panel. The fender has a front edge portion. The headlamp assembly has a housing and a lens. The lens defines an upper section and a lower section with a slot defined therebetween. The trim panel is installed to the housing within the slot. The trim panel is attached to the housing of the headlamp assembly and is retained by the front edge portion of the fender.

16 Claims, 8 Drawing Sheets

VEHICLE FRONT END ASSEMBLY

BACKGROUND

Technical Field

The present disclosure generally relates to a vehicle front end assembly. More specifically, the present disclosure relates to a vehicle front end assembly that includes a headlamp assembly with a lens shaped with a decorative slot with a trim panel that is installed to the headlamp assembly within the slot, the trim panel having a projection that is inserted behind an adjacent fender to ensure a secure attachment of the trim panel to the vehicle.

Background Information

Headlamp assemblies are typically made of two basic structural elements, a housing and a lens that attaches to the housing.

SUMMARY

One object of the present disclosure is to provide a vehicle front end assembly with a headlamp assembly with a lens shaped with a decorative slot with a trim panel installed to the headlamp assembly within the slot, the trim panel having a projection that extends behind an adjacent fender to ensure a secure attachment of the trim panel to the vehicle.

In view of the state of the known technology, one aspect of the present disclosure is to provide a vehicle front end assembly with a fender, a headlamp assembly and a trim pane. The fender has a front edge portion. The headlamp assembly has a housing and a lens. The lens defines an upper section and a lower section with a slot defined therebetween. The trim panel is installed to the housing within the slot. The trim panel is attached to the housing of the headlamp assembly and is retained by the front edge portion of the fender.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
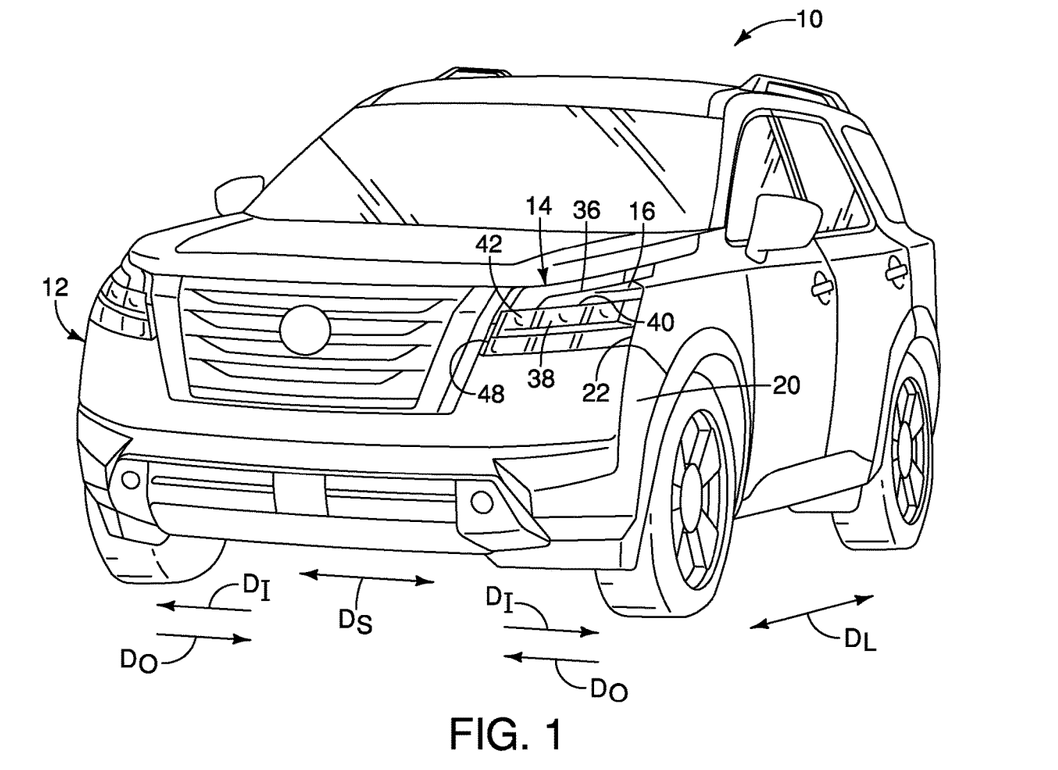
FIG. 1 is a perspective view of a vehicle with a front end assembly that showing a headlamp assembly with a lens that defines a slot with a trim panel installed to the headlamp assembly within the slot in accordance with an exemplary embodiment.
Figure 2:
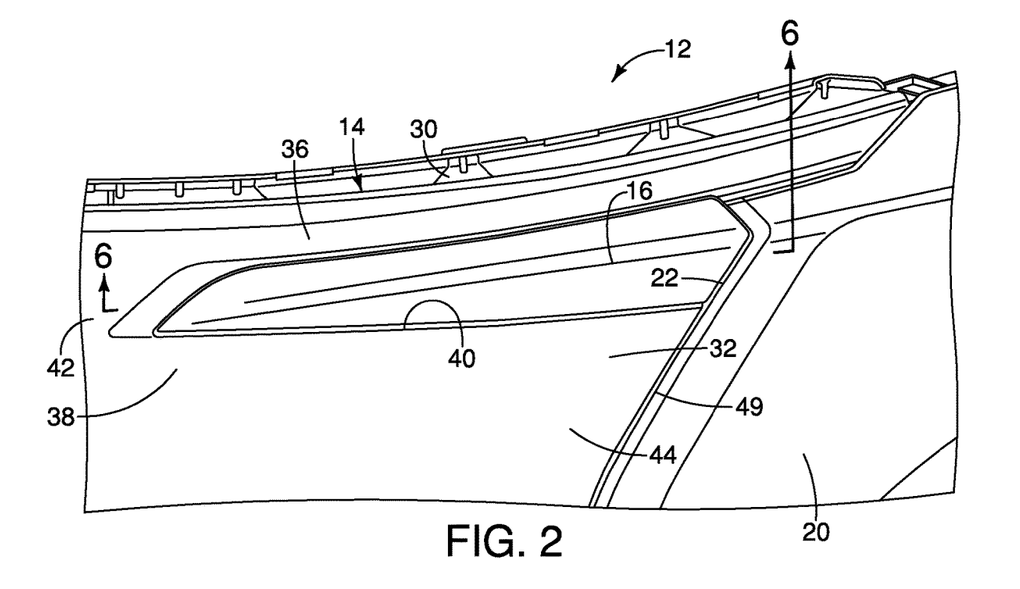
FIG. 2 is a perspective front view of a portion of the front end assembly showing the trim panel installed to the slot of the headlamp assembly in accordance with the exemplary embodiment.

Referring initially to FIG. 1, a vehicle 10 having a vehicle front end assembly 12 that includes a headlamp assembly 14 with a trim panel 16 is illustrated in accordance with an exemplary embodiment.

The vehicle 10 can be any of a variety of vehicle designs, such as an SUV (sports utility vehicle), a sedan, a coupe, a van, pickup truck or a commercial vehicle. The vehicle 10 can include a frame (not shown) where the body of the vehicle and the vehicle front end assembly 12 are bolted or otherwise fixed to the frame, or, the vehicle 10 can be manufactured with unibody construction where the body elements at least partially define the frame of the vehicle 10.

The vehicle front end assembly 12 (herein after front end assembly 12) of the vehicle 10 includes a fender 20 that defines a front edge portion 22. The fender 20 is attached to frame element(s) (not shown) or unibody constructed element(s) (not shown). The frame element (not shown) or unibody constructed elements (not shown) are conventional structural vehicle elements. Therefore, description of the frame elements and/or unibody constructed elements is omitted for the sake of brevity.

Several directions are defined by the vehicle 10, such as a vehicle longitudinal direction $D_L$, inboard directions $D_I$, an outboard directions $D_O$ and a vehicle lateral direction $V_S$ (a vehicle side-to-side direction), as shown in FIG. 1. The inboard directions $D_I$, an outboard directions $D_O$ are defined relative to an imaginary centerline (not shown) that extends through the vehicle 10 in the vehicle longitudinal direction $D_L$.

Figure 3:
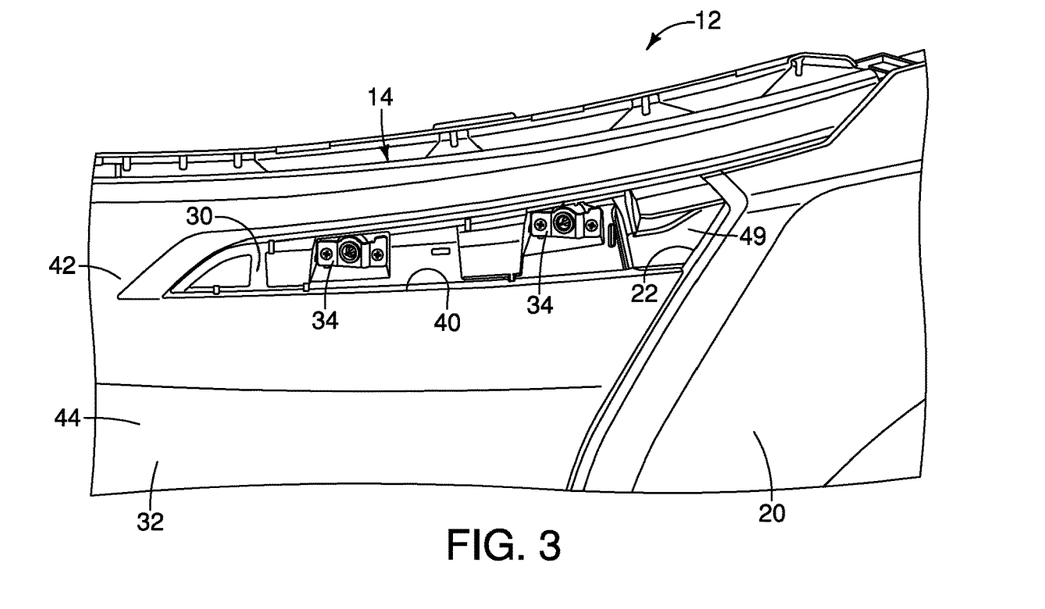
FIG. 3 is another perspective front view of the portion of the front end assembly similar to FIG. 2 with the trim panel removed showing a portion of a housing of the headlamp assembly revealed within the slot and further showing doghouse structures of the housing within the slot in accordance with the exemplary embodiment.
Figure 4:
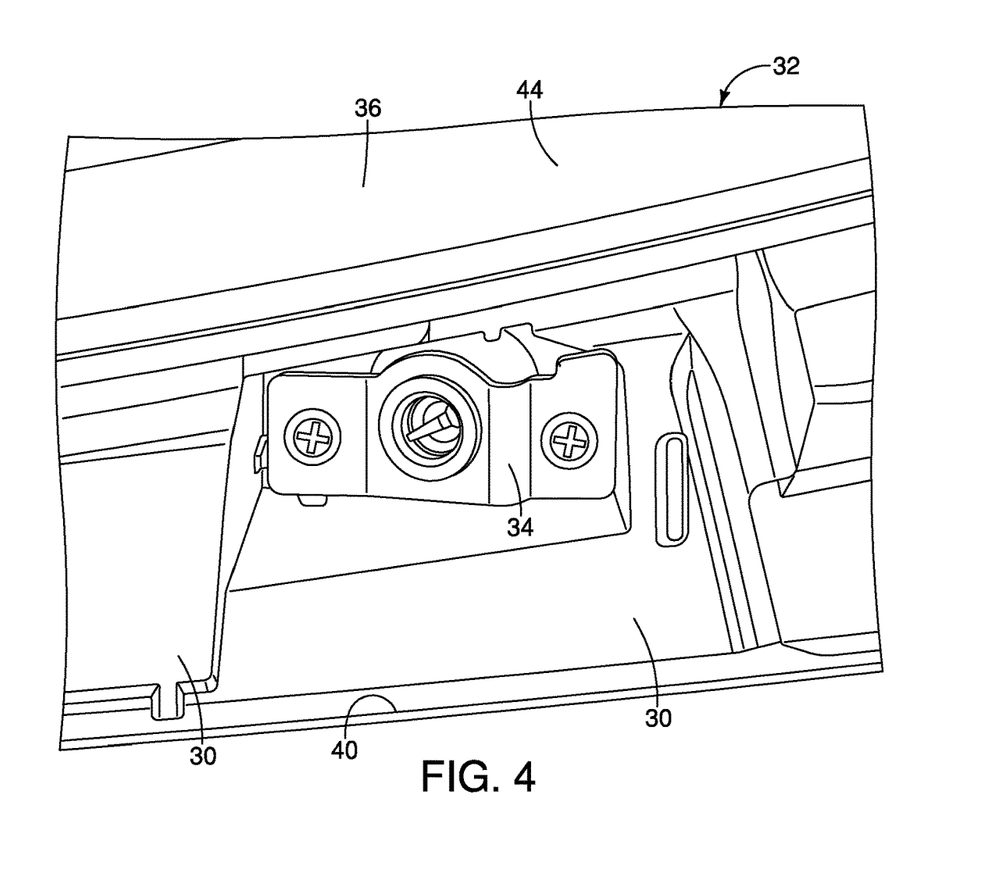
FIG. 4 is a perspective front view of a portion of the headlamp assembly with the trim panel removed showing one of the doghouse structures located on the housing within the slot defined by the lens of the headlamp assembly in accordance with the exemplary embodiment.

The headlamp assembly 14 includes a housing 30 and a lens 32. The housing 30 is attached to other elements of the front end assembly 12, such as structural elements (not show) in a conventional manner. The housing 30 defines a pair of doghouse structures 34 shown in FIGS. 3-4 and 6-7. The lens 32 defines an upper section 36, a lower section 38, a slot 40 and a joining section 42 (FIGS. 1-3 and 5). The slot 40 is defined between the upper section 36 and the lower section 38. With the trim panel 16 removed from the headlamp assembly 14, the doghouse structures 34 are visible within the slot 40 between the upper section 46 and lower section 38 of the lens 32, as shown in FIGS. 3 and 4.

As shown in FIGS. 1-3 and 5, the upper section 36, the lower section 38 and the joining section 42 have a common finished surface 44 that is continuous and uninterrupted throughout the upper section 36, the lower section 38 and the joining section 42. The finished surface 44 is only interrupted by the slot 40 and any surface contours that can be included for design and/or optical purposes.

Figure 5:
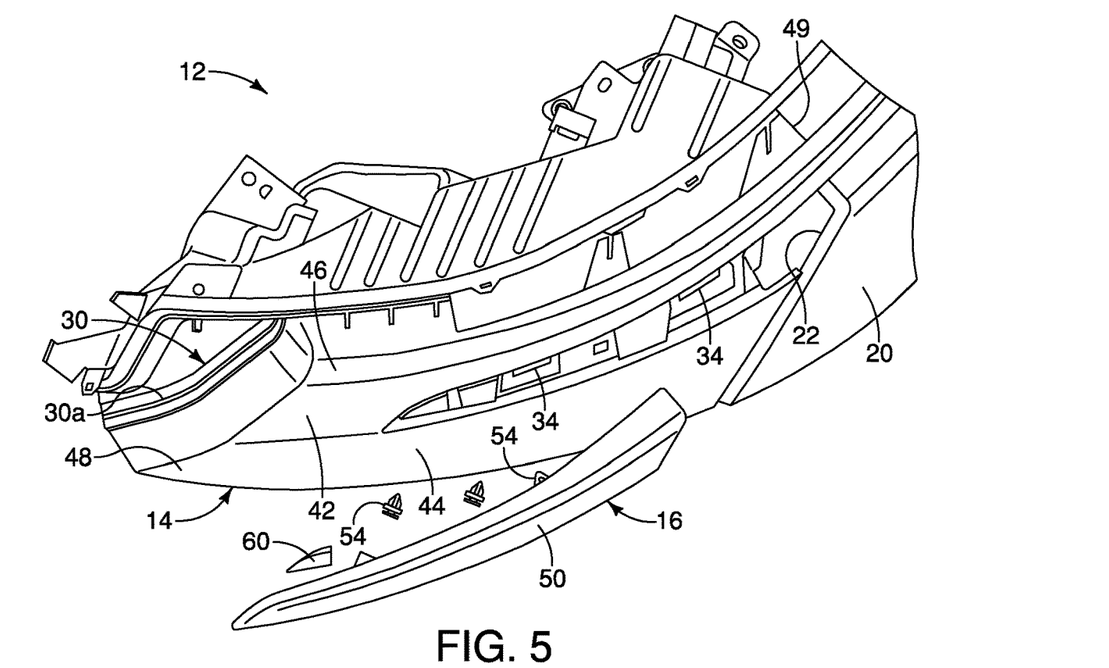
FIG. 5 is a top exploded view of a portion of the front end assembly showing the headlamp assembly with the trim panel positioned just prior to installation to the headlamp assembly and further showing double-sided tape in accordance with the exemplary embodiment.

As shown in FIG. 5, the joining section 42 extends along a forward end 30a (forward edge 30a) of the housing 30 from a forward end 46 (an inboard end) of the upper section 36 of the lens 32 to a forward end 48 the lower section 38. The slot 40 extends from the joining section 42 to a rearward end 49 of the housing 30 of the headlamp assembly 14.

Figure 8:
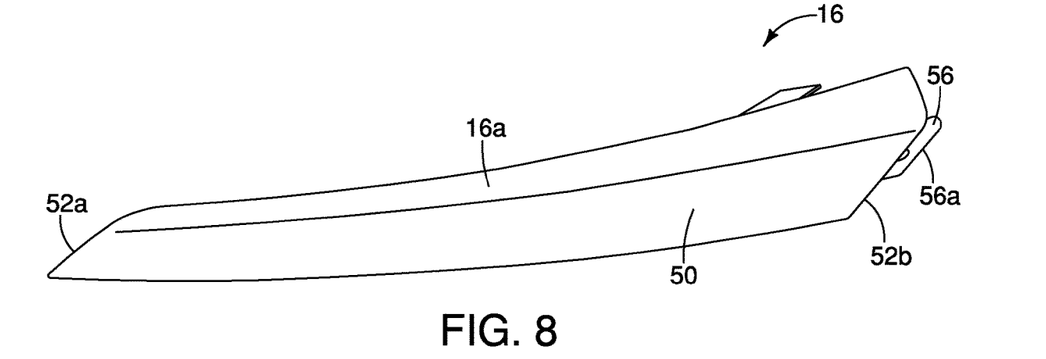
FIG. 8 is a front view of the trim panel removed from the vehicle showing a trim surface of the trim panel in accordance with the exemplary embodiment.
Figure 9:
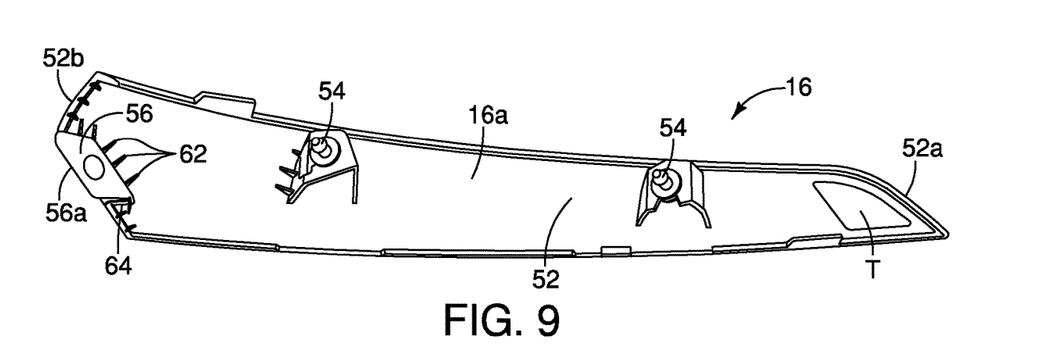
FIG. 9 is a rear view of the trim panel removed from the vehicle showing an attachment surface of a main body of the trim panel with two snap-fitting projections and a protrusion extending from a rearward end of the attachment surface of the main body of the trim panel in accordance with the exemplary embodiment.

The trim panel 16 has a main body 16a that defines a trim surface 50 (FIG. 8) and an attachment surface 52 (FIG. 9) opposite the trim surface 50. The trim surface 50 (a finished surface) has a smooth contour and is shaped and contoured to fit within the slot 40. More specifically, with the trim panel 16 installed to the housing 30 of the headlamp assembly 14, the trim surface 50 conforms to contours of a finished surface 44 of the lens 32 of the headlamp assembly 14. A description of the attachment of the trim panel 16 to the housing 30 is provided in greater detail below.

The attachment surface 52 of the trim panel 16 includes at least two snap-fitting projections 54 (FIGS. 7, 9 and 10) and a flange or projection 56 (FIGS. 6, 11-13 and 15-18).

Figure 6:
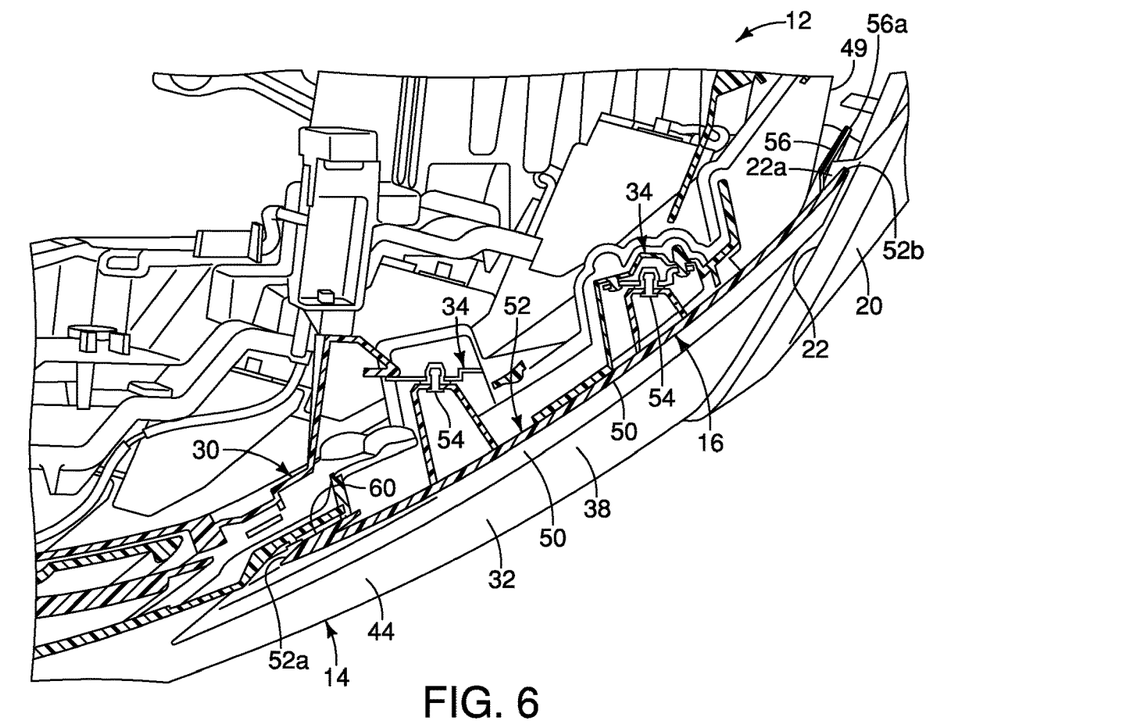
FIG. 6 is a top cross-sectional view taken along the line 6-6 in FIG. 2 showing the trim panel installed to the housing of the headlamp assembly with snap-fitting projections of the trim panel installed to the doghouses of the housing in accordance with the exemplary embodiment.
Figure 7:
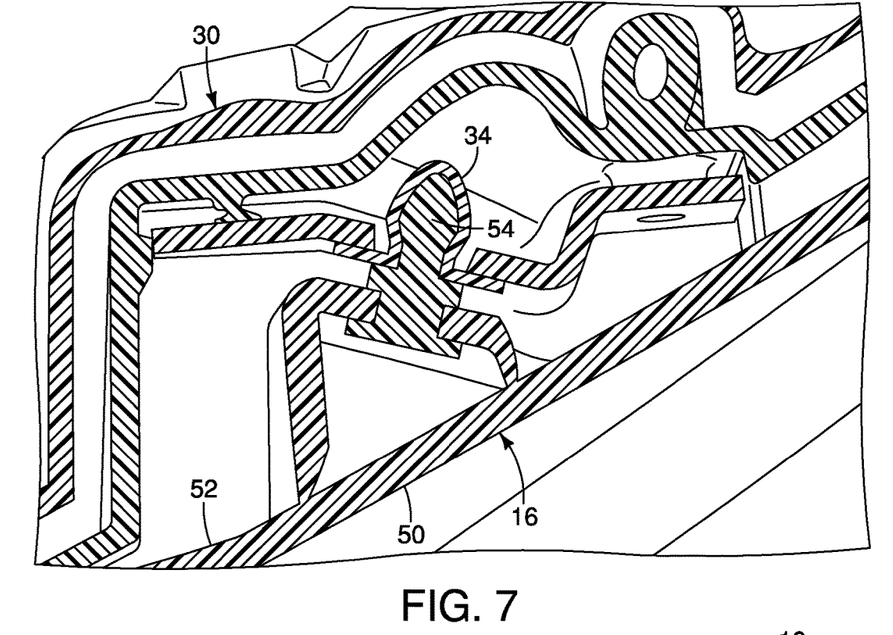
FIG. 7 is a top cross-sectional view of one of the doghouses with the snap-fitting projection installed to the one of the doghouses in accordance with the exemplary embodiment.

The snap-fitting projections 54 extend rearward from the attachment surface 53 of the main body 16a and are spaced apart from one another by a distance that corresponds to spacing between the doghouse structures 34. With the trim panel 16 installed to the housing 30 within the slot 40, each of the snap-fitting projections 54 is inserted into and retained within a corresponding one of the doghouse structures 34, as shown in FIGS. 6 and 7.

Figure 12:
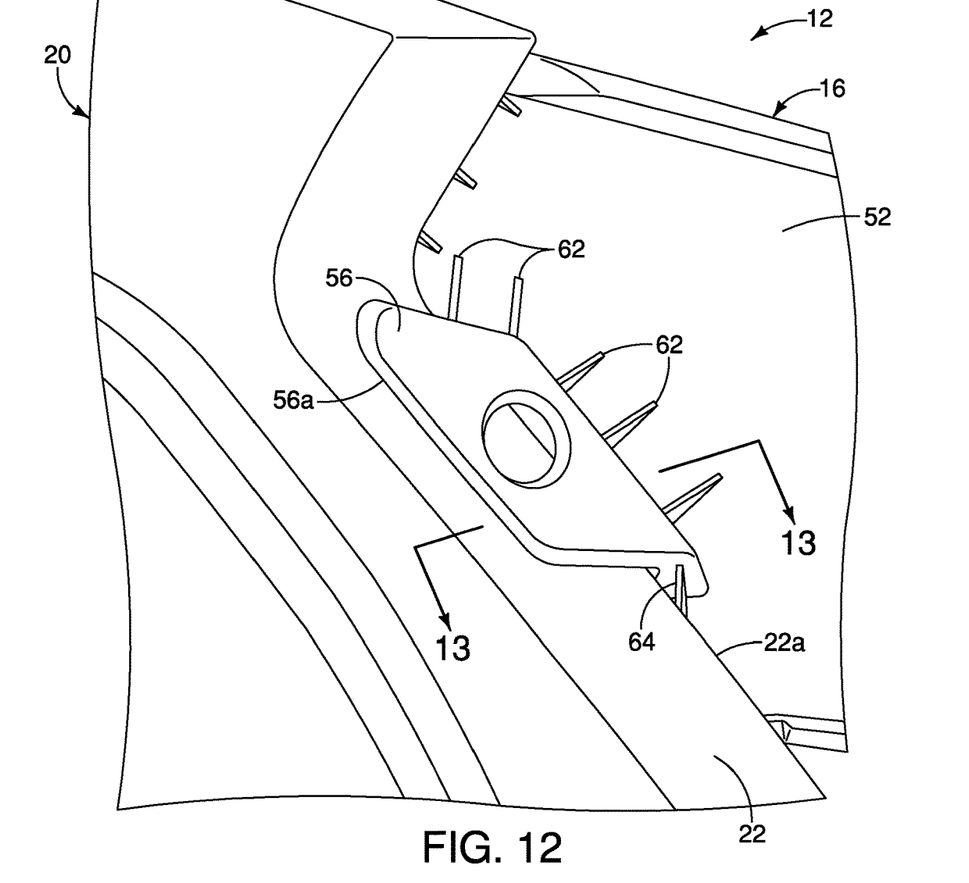
FIG. 12 is a rear view of a portion of the front end assembly showing a front edge portion of the fender with the projection of the attachment surface of the trim panel extending behind the front edge portion of the fender in accordance with the exemplary embodiment.
Figure 13:
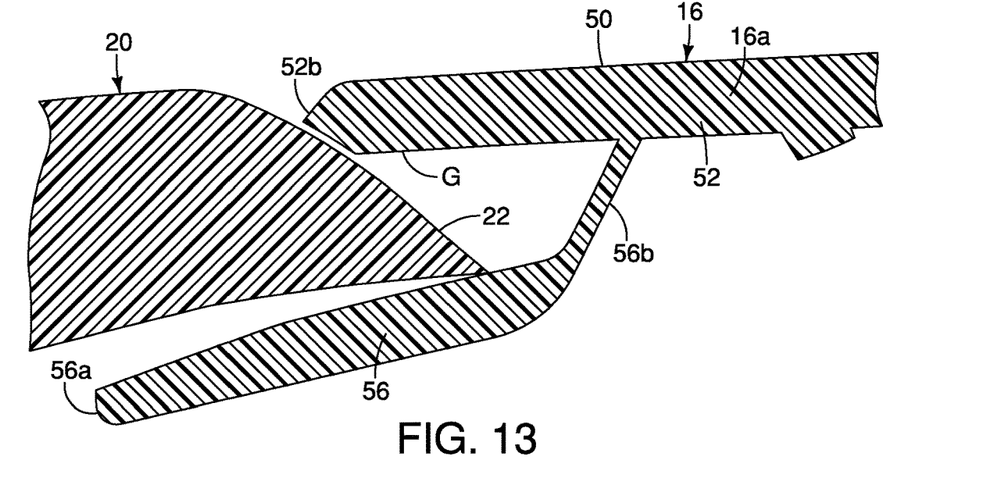
FIG. 13 is a cross-sectional view taken along the line 13-13 in FIG. 12 showing the front edge portion of the fender captured between the projection and the main portion of the trim panel in accordance with the exemplary embodiment.
Figure 14:
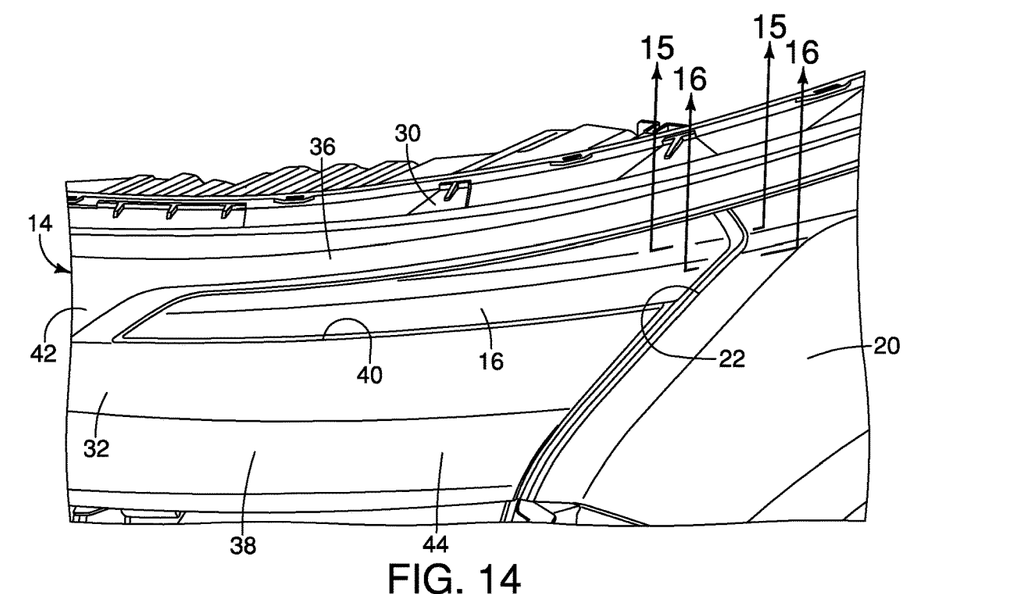
FIG. 14 is a side view of the front end assembly and the fender showing the trim panel installed to the headlamp assembly in accordance with the exemplary embodiment.

As shown in FIGS. 8-9, 11-13 and 15-18, the projection 56 extends rearward from a rearward area of the attachment surface 52 of the main body 16a of the trim panel 16. The projection 56 has a distal end 56a that extends beyond an adjacent outboard end of the trim panel 16. A main portion of the projection 56 is spaced apart and inboard of the trim panel 26 itself via a projecting portion 56b (FIG. 13). More specifically, when the trim panel 16 is installed to the housing 30 of the headlamp assembly 14, the projection 56 is positioned and dimensioned to extend behind (inboard of) the front edge portion 22 of the fender 20.

The trim panel 16 is installed to the housing 30 of the headlamp assembly 14 by first inserting the projection 56 behind the front edge portion 22 of the fender 20 and pushing the projection 56 further behind the fender 20. Thereafter, the snap-fitting projection 54 are inserted into respective ones of the doghouse structures 34. As well, double sided adhesive tape 60 is adhered to an inboard end 52a of the attachment surface 52 of the trim panel 16. Once the trim panel 16 is fully installed, pressing of the inboard end of the trim panel 16 forces the double sided adhesive tape 60 into an adjacent surface of the housing 30 thereby further attaching the trim panel 16 to the housing 30.

With the projection 56 extending behind the fender 20, the trim panel 16 is in effect attached to the housing 30 of the headlamp assembly 14 and is retained and positioned by the front edge portion 22 of the fender 20.

Specifically, as shown in FIGS. 12-13 and 15-18, the distal end 56a of the projection 56 extends behind the front edge portion 22 of the fender 20. A gap G is defined between the projection 56 and the rearward end of the main body 16a of the trim panel 16. The front edge portion 22 of the fender 20 is retained within the gap G. At the same time, the distal end 56a of the projection 56 is prevented from moving in the vehicle lateral directions $D_S$ (inboard and outboard directions $D_I$ and $D_O$) with the front edge portion 22 wedged within the gap G.

Figure 10:
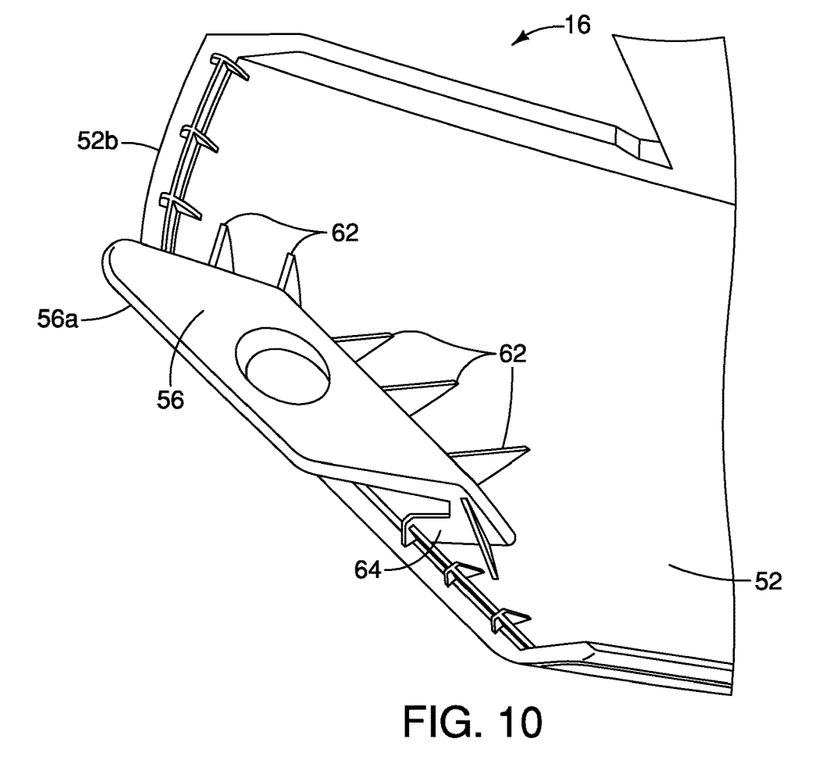
FIG. 10 is a rear view of a portion of the attachment surface of the main body of the trim panel showing details of one of the snap-fitting projections in accordance with the exemplary embodiment.
Figure 11:
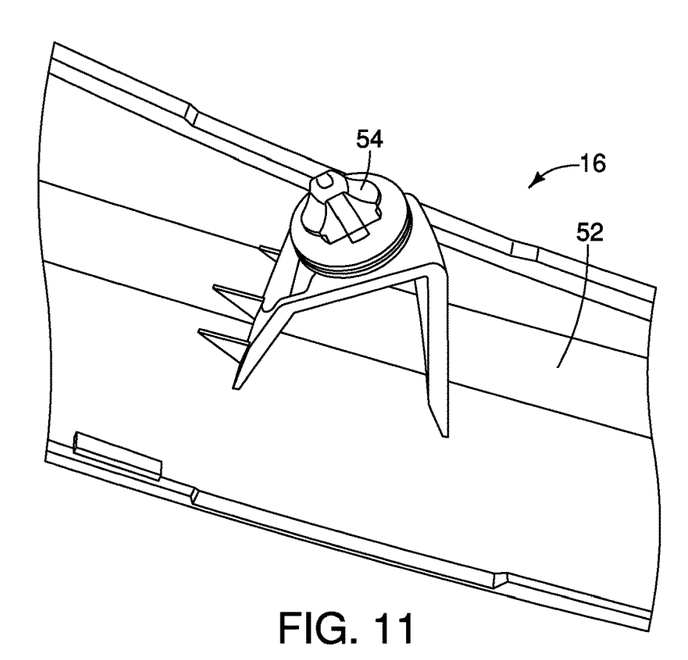
FIG. 11 is a rear view of the rearward end of the attachment surface of the main body of the trim panel showing details of the projection in accordance with the exemplary embodiment.
Figure 18:
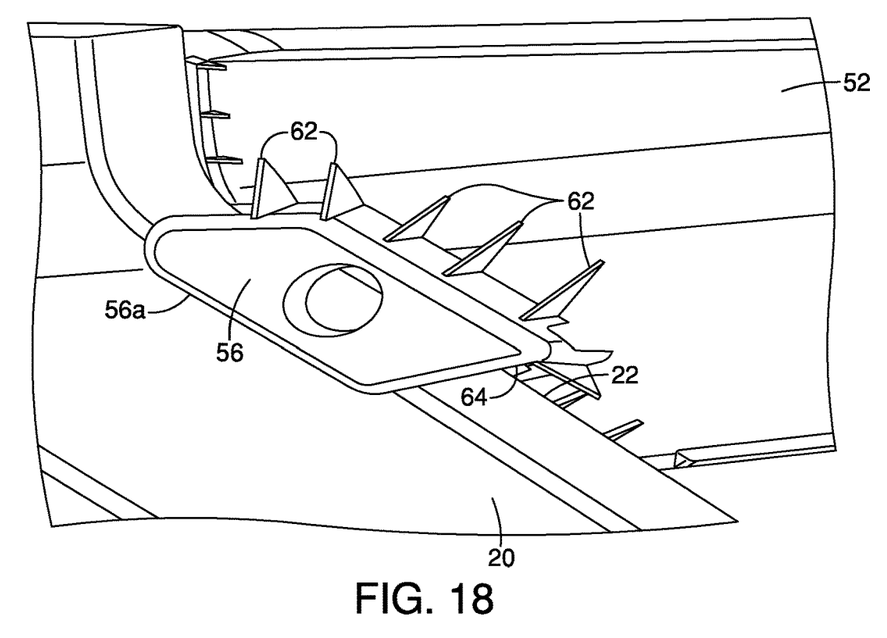
FIG. 18 is a rear view of the portion of the vehicle front end assembly showing a plurality of additional ribs extending from a rearward portion of the projection in accordance with the exemplary embodiment.

In order to ensure the strength of projection 56, the attachment surface 52 is provided with a plurality of first ribs 62 that extend from the attachment surface 52 of the trim panel 16 forward of the projection 56 to an inboard surface of the projection 56, as shown in FIGS. 10, 12 and 18. The plurality of ribs 62 have a non-contacting relationship with the front edge portion 22 of the fender 20.

Figure 15:
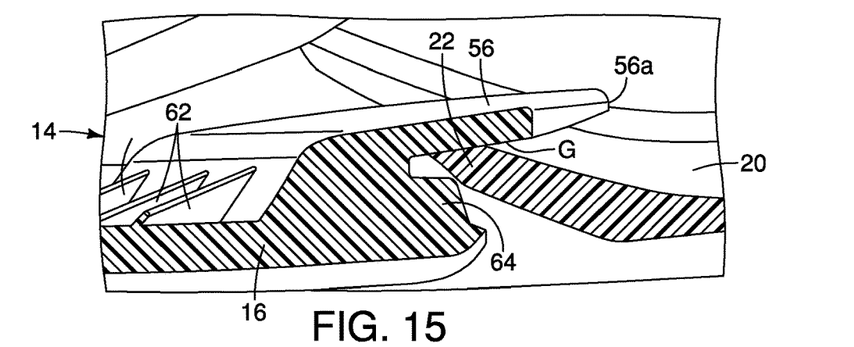
FIG. 15 is a cross-sectional view of a portion of the vehicle front end assembly taken along the line 15-15 in FIG. 14 showing the front edge portion of the fender extending into a gap defined between the projection and a rearward end of the trim panel in accordance with the exemplary embodiment.
Figure 16:
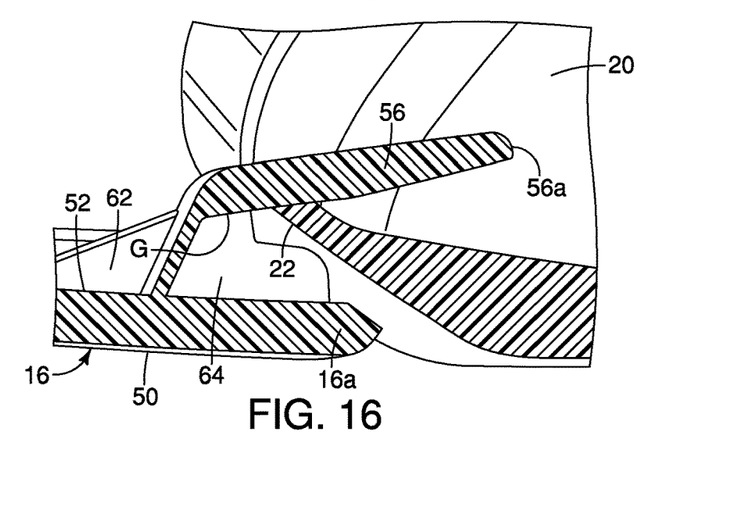
FIG. 16 is another cross-sectional view of a portion of the vehicle front end assembly taken along the line 16-16 in FIG. 14 showing the front edge portion of the fender extending into the gap defined between the projection and a rearward end of the trim panel in accordance with the exemplary embodiment.
Figure 17:
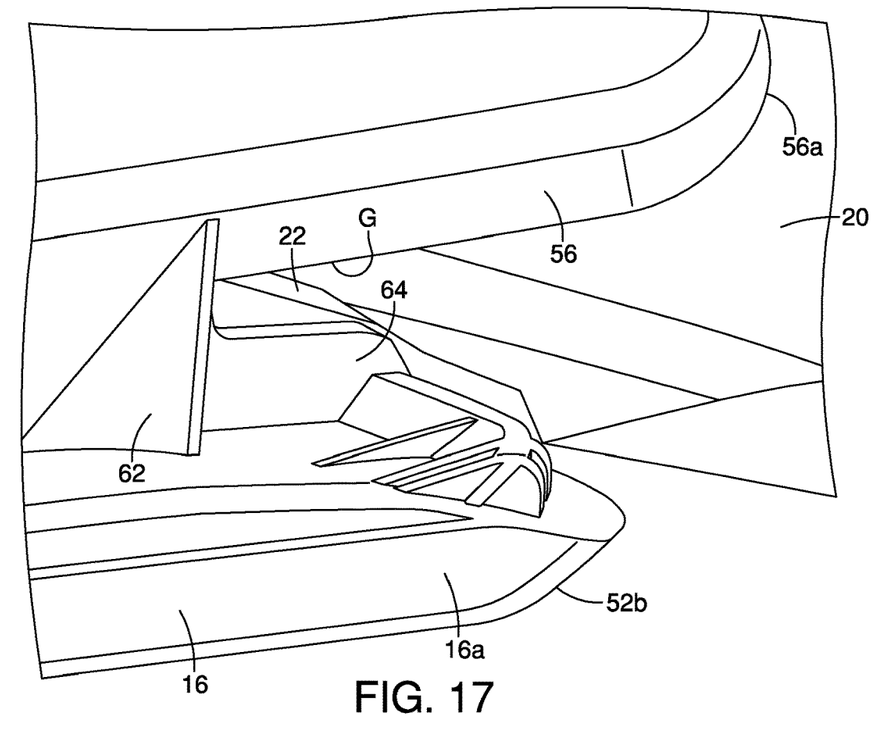
FIG. 17 is a top view of the portion of the vehicle front end assembly showing at least one reinforcement rib extending from a forward portion of the projection within the gap in accordance with the exemplary embodiment.

Further, the trim panel 16 includes at least one second rib 64 that extends from a rearward end 52b of the attachment surface 52 of the trim panel 16 to an outboard surface the projection 56 such that the at least one second rib 64 contacts the front edge portion 22 of the fender 20, as shown in FIGS. 15-17.

The projection 56 servers several purposes. First, with the fender 20 retained within the gap G, the headlamp assembly 14 is more securely retained in position. Consequently, ability of the fit and finish of the vehicle 10 is improved because the alignment between the headlamp assembly 14 and the fender 20 is reliably maintained. Further, over time as the vehicle 10 ages, rattles and/or vibrations that might otherwise occur between the fender 20 and the headlamp assembly 14 are prevented.

The vehicle structures (other than the fender 20, the headlamp assembly 14 and the trim panel 16) are conventional components that are well known in the art. Since such vehicle structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end assembly, comprising:
   a fender having a front edge portion;
   a headlamp assembly having a housing and a lens, the lens defining an upper section and a lower section with a slot defined therebetween; and
   a trim panel installed to the housing within the slot, the trim panel being attached to the housing of the headlamp assembly and being retained by the front edge portion of the fender.

2. The vehicle front end assembly according to claim 1, wherein
   the housing of the headlamp assembly includes a doghouse structure, and
   the trim panel includes at least one snap fitting projection that is inserted into the doghouse structure and retained therein.

3. The vehicle front end assembly according to claim 2, wherein
   the trim panel includes a projection that extends behind the front edge portion of the fender.

4. The vehicle front end assembly according to claim 3, wherein
   the trim panel includes a plurality of first ribs that extend from a main portion of the trim panel to an inboard surface of the projection such that the plurality of ribs have a non-contacting relationship with the front edge portion of the fender.

5. The vehicle front end assembly according to claim 4, wherein
   the trim panel includes at least one second rib that extends from a rearward end of the trim panel to an outboard surface the projection such that the at least one second rib contacts the front edge portion of the fender.

6. The vehicle front end assembly according to claim 1, wherein
   the trim panel has a trim surface and an attachment surface opposite the trim surface such that with the trim panel installed to the housing of the headlamp assembly the trim surface conforms to contours of a finished surface of the lens of the headlamp assembly.

7. The vehicle front end assembly according to claim 6, wherein
   the housing of the headlamp assembly includes a doghouse structure, and
   the trim panel includes at least one snap fitting projection that extends from the attachment surface of the trim panel, the at least one snap fitting projection being inserted into the doghouse structure and retained therein.

8. The vehicle front end assembly according to claim 7, wherein
   the trim panel includes a projection that extends from a rearward area of the attachment surface of the trim panel to a location behind the front edge portion of the fender.

9. The vehicle front end assembly according to claim 8, wherein
   the trim panel includes a plurality of first ribs that extend from the attachment surface of the trim panel forward of the projection to an inboard surface of the projection such that the plurality of ribs have a non-contacting relationship with the front edge portion of the fender.

10. The vehicle front end assembly according to claim 9, wherein
    the trim panel includes at least one second rib that extends from a rearward end of the attachment surface of the trim panel to an outboard surface the projection such that the at least one second rib contacts the front edge portion of the fender.

11. The vehicle front end assembly according to claim 1, wherein the lower section and the upper section of the lens of the headlamp assembly define a joining section that extends from a forward end of the upper section to a forward end the lower section such that the slot extends from the joining section to a rearward end of the housing of the headlamp assembly.

12. The vehicle front end assembly according to claim 11, wherein
the trim panel has a trim surface and an attachment surface opposite the trim surface such that with the trim panel installed to the housing of the headlamp assembly the trim surface conforms to contours of a finished surface of the lens of the headlamp assembly.

13. The vehicle front end assembly according to claim 12, wherein
the housing of the headlamp assembly includes a doghouse structure, and
the trim panel includes at least one snap fitting projection that extends from the attachment surface of the trim panel, the at least one snap fitting projection being inserted into the doghouse structure and retained therein.

14. The vehicle front end assembly according to claim 13, wherein
the trim panel includes a projection that extends from a rearward area of the attachment surface of the trim panel to a location behind the front edge portion of the fender.

15. The vehicle front end assembly according to claim 14, wherein
the trim panel includes a plurality of first ribs that extend from the attachment surface of the trim panel forward of the projection to an inboard surface of the projection such that the plurality of ribs have a non-contacting relationship with the front edge portion of the fender.

16. The vehicle front end assembly according to claim 15, wherein
the trim panel includes at least one second rib that extends from a rearward end of the attachment surface of the trim panel to an outboard surface the projection such that the at least one second rib contacts the front edge portion of the fender.

\* \* \* \* \*